(12) United States Patent
Poulin et al.

(10) Patent No.: US 7,000,479 B1
(45) Date of Patent: Feb. 21, 2006

(54) HEATED PRESSURE TRANSDUCER

(75) Inventors: James M. Poulin, Derry, NH (US);
Keith F. Mello, Amherst, NH (US)

(73) Assignee: MKS Instruments, Inc., Wilmington, MA (US)

( * ) Notice: Subject to any disclaimer, the term of this patent is extended or adjusted under 35 U.S.C. 154(b) by 0 days.

(21) Appl. No.: 11/119,604

(22) Filed: May 2, 2005

(51) Int. Cl.
*G01L 19/24* (2006.01)
(52) U.S. Cl. .................................................. 73/708
(58) Field of Classification Search .................. 73/708, 73/706, 714, 754–756
See application file for complete search history.

(56) References Cited

U.S. PATENT DOCUMENTS

| | | | |
|---|---|---|---|
| 4,785,669 A | 11/1988 | Benson et al. | |
| 5,625,152 A | 4/1997 | Pandorf et al. | |
| 5,932,332 A | 8/1999 | Pandorf et al. | |
| 5,965,821 A | 10/1999 | Grudzien | |
| 6,029,525 A | 2/2000 | Grudzien | |
| 6,105,436 A | 8/2000 | Lischer et al. | |
| 6,772,640 B1 | 8/2004 | Quigley et al. | |

*Primary Examiner*—William Oen
(74) *Attorney, Agent, or Firm*—McDermott Will & Emery LLP (57) ABSTRACT

A pressure transducer assembly including a sensor enclosure, a pressure sensor received in the sensor enclosure, a tube connected to the pressure sensor and extending out of the sensor enclosure for connection to a source of fluid, an electronics circuit board electrically connected to the pressure sensor, and an electronics enclosure containing the electronics board and secured to the sensor enclosure. The electronics enclosure includes an external housing constructed of thermally conductive material, and a heat transfer plate constructed of thermally conductive material. The heat transfer plate is in physical contact with heat-generating elements of the electronics circuit board and in physical contact with the external housing, such that heat from the heat-generating elements can be dissipated through the external housing. This arrangement allows the circuit board to remain cool even as the sensor is heated.

20 Claims, 7 Drawing Sheets

PRIOR ART

FIG. 8

PRIOR ART

FIG. 9

HEATED PRESSURE TRANSDUCER

FIELD OF THE DISCLOSURE

The present disclosure relates generally to pressure transducer assemblies. More particularly, the present disclosure relates to a pressure transducer assembly having improved thermal characteristics.

BACKGROUND OF THE DISCLOSURE

Various vapor deposition processes are known to be useful, for example, in the production of semiconductor products. These processes are typically used to deposit very thin layers of various substances including conductive, semiconductive and insulative materials onto a substrate. Vapor deposition processes typically require each deposited material to be transported to the deposition chamber in a gas state or vapor phase where it is condensed onto the work in process.

Efficient operation of such a deposition process requires precise control of the pressure of the gases or vapors used in the process. Where the deposit material in its vapor phase has a relatively low condensation temperature (i.e., well below room temperature), the pressure of the material may be controlled using pressure transducers operating at room temperature. However, where the gas state or vapor phase of a deposit material has a relatively high condensation temperature, i.e., above room temperature, to avoid condensation, such materials are heated and maintained above their condensation temperatures, and thus heated transducers are usually required for measuring the pressures of these hot gases and vapors. Heated pressure transducers are also often heated to prevent sublimation or precipitation of solid material. For example, as is well known, ammonium chloride ($NH_4Cl$) is a chemical by-product of processes for depositing layers of silicon nitride ($Si_3N_4$), and if the pressure and temperature drop too low the $NH_4Cl$ sublimates so that a solid salt forms on any exposed cool surfaces. To prevent such sublimation of $NH_4Cl$, these processes are often conducted at 150° C.

Figure 8:
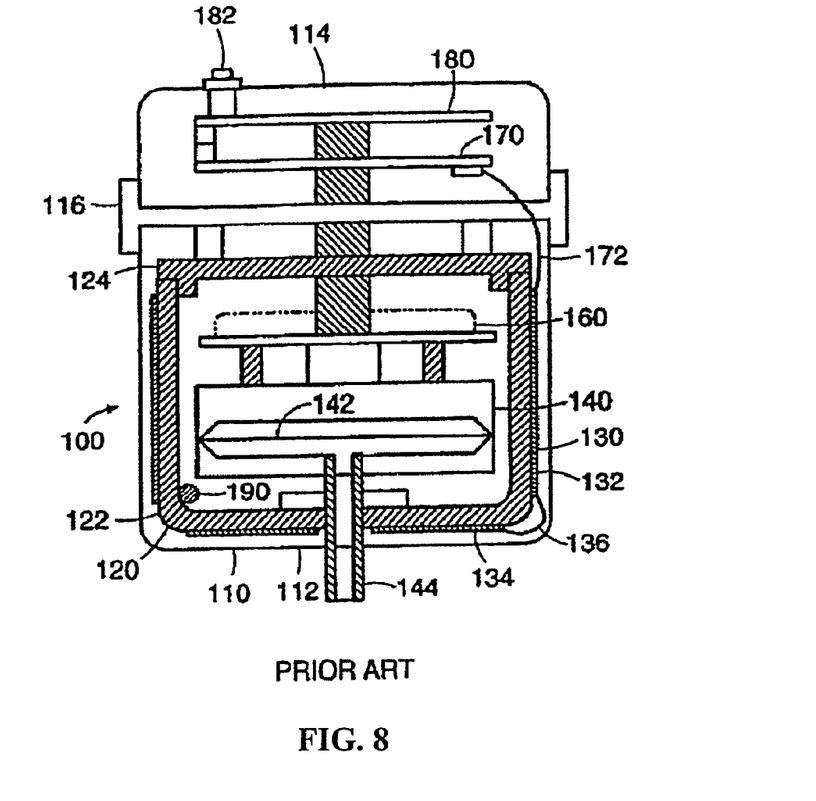
FIG. 8 is a sectional view of an exemplary embodiment of a pressure transducer assembly constructed in accordance with the prior art.

FIG. 8 shows a sectional view of a portion of a prior art heated pressure transducer assembly 100 of the type that is typically used in connection with relatively high temperature, vapor deposition processes. The transducer 100 includes several major components such as an external shell 110, a heater shell 120, a heater 130, a capacitive pressure sensor 140, a front end electronics assembly 160, a heater control electronics assembly 170, and an input/output (I/O) electronics assembly 180. As will be discussed in greater detail below, the transducer 100 generates an output signal indicative of a pressure measured by sensor 140.

For convenience of illustration, many mechanical details of the transducer 100, such as the construction of the sensor 140 and the mounting of the sensor 140 and the electronics assemblies 160, 170, 180, have been omitted from FIG. 8. However, heated capacitive pressure transducers such as transducer 100 are well known and are described for example in U.S. Pat. No. 5,625,152 (Pandorf); U.S. Pat. No. 5,911,162 (Denner); and U.S. Pat. No. 6,029,525 (Grudzien).

Briefly, the external shell 110 includes a lower enclosure 112, an upper electronics enclosure 114, and a joiner 116 that holds the enclosures 112, 114 together. The heater shell 120 is disposed within the lower enclosure 112 and includes a lower enclosure or can 122 and a cover 124. The sensor 140 and the front end electronics assembly 160 are disposed within the heater shell 120, while the heater control electronics assembly 170 and the I/O electronics assembly 180 are disposed within the upper electronics enclosure 114.

The heater 130 includes a barrel heater 132 wrapped around the can 122 and an end heater 134 that is secured to a bottom of the can and is electrically connected to the barrel heater 132 via wires 136. A temperature sensor (e.g., a thermistor) 190 is fixed to an internal surface of heater shell 120.

The sensor 140 includes a metallic, flexible, diaphragm 142 and a pressure tube 144 that extends from an area proximal to the diaphragm through the heater shell 120, and through the lower sensor enclosure 112. The lower, or external, end of tube 144 is generally coupled to a source of fluid (not shown). Pressure of fluid in the source is communicated via the tube 144 to the lower surface of diaphragm 142 and the diaphragm 142 flexes up or down in response to changes in pressure within the tube 144. The diaphragm 142 and a reference conductive plate of the sensor 140 form a capacitor, and the capacitance of that capacitor varies in accordance with movement or flexion of the diaphragm. Accordingly, that capacitance is indicative of the pressure within the tube 144. The front end electronics assembly 160 and the I/O electronics assembly 180 cooperatively generate an output signal representative of the capacitance of sensor 140 which is, of course, also representative of the pressure within the tube 144. The I/O electronics assembly 180 makes that output signal available to the environment external to transducer 100 via an electronic connector 182.

Figure 9:
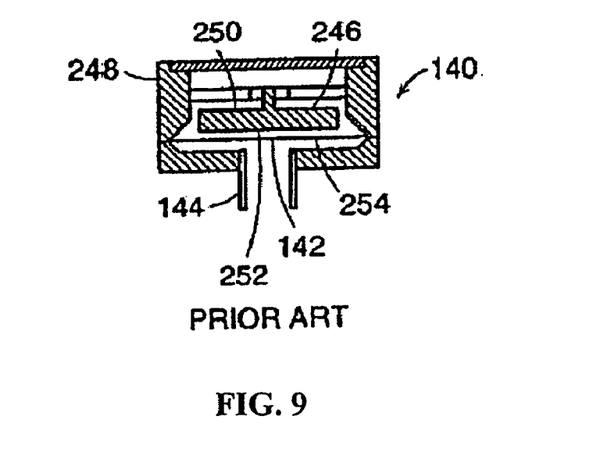
FIG. 9 is a sectional view of a capacitive pressure sensor the assembly of FIG. 8.

FIG. 9 shows one example of how a capacitive pressure sensor 140 can be constructed. Capacitive pressure sensors of the type shown in FIG. 9 are discussed in greater detail in U.S. Pat. No. 6,029,525 (Grudzien). The sensor 140 shown in FIG. 9 includes a circular, conductive, metallic, flexible diaphragm 142, a pressure tube 144, and an electrode 246. The electrode 246 and the diaphragm 142 are mounted within a housing 248. The electrode 246 includes a ceramic block 250 and a conductive plate 252. The ceramic block 250 is rigidly mounted to the housing 248 so that a bottom face of block 250 is generally parallel to, and spaced apart from, the diaphragm. The bottom face of block 250 is normally planar and circular. The conductive plate 252 is deposited onto the bottom face of block 250 and is also generally parallel to, and spaced apart from, the diaphragm. The conductive plate 252 and the diaphragm 142 form two plates of a variable capacitor 254. The capacitance of capacitor 254 is determined in part by the gap, or spacing between, the diaphragm 142 and the conductive plate 252. Since the diaphragm flexes up and down (thereby changing the spacing between diaphragm 142 and conductive plate 252) in response to pressure changes in tube 144, the capacitance of capacitor 254 is indicative of the pressure within tube 144.

FIG. 9 shows only one of the many known ways of configuring a capacitive pressure sensor 140. However, capacitive pressure sensors 140 generally include one or more conductors that are held in spaced relation to a flexible, conductive, diaphragm. The diaphragm and the conductors form plates of one or more variable capacitors and the capacitance of those capacitors varies according to a function of the pressure in tube 144.

Returning to FIG. 8, ideally, the output signal of transducer 100 varies only according to changes in the pressure of the fluid in tube 144. However, changes in the temperature of the transducer 100, or temperature gradients within the transducer 100, can affect the output signal. This is primarily due to the different coefficients of thermal expansion of different materials used to construct the sensor 140. A secondary effect relates to the temperature sensitive performance of the front end electronics 160. Accordingly, the accuracy of transducer 100 can be adversely affected by temperature changes in the ambient environment.

To minimize the adverse effect of changing ambient temperature, the temperature sensitive components of the transducer 100 (i.e., the sensor 140 and the front end electronics 160) are disposed within the heater shell 120, and in operation the heater 130 heats the heater shell 120 to a controlled, constant temperature. The heater 130 and the heater shell 120 essentially form a temperature controlled oven that maintains the temperature of the temperature sensitive components at a constant pre-selected value.

In operation, the heater control electronics assembly 170 applies an electrical signal to the heater 130 via wires 172. The heater control electronics assembly 170 normally includes components for monitoring the temperature of the heater shell 120 via sensor 190 and adjusting the signal applied to the heater 130 so as to maintain the shell 120 at a constant temperature.

While it is necessary to heat the sensor 140 and the front end electronics 160, it is preferable to keep the heater control electronics assembly 170 and the I/O electronics assembly 180 at a relative low temperature to decrease their failure rate. Therefore, the joiner 116 that holds the lower enclosure 112 to the upper enclosure 114 is made from a thermally conductive material, such as aluminum, to dissipate heat from the heater 130 and the heater shell 120 and away from the heater control electronics assembly 170 and the I/O electronics assembly. Alternatively, or in addition, the transducer may be provided with vents and thermal shunts to enable convective cooling between the lower enclosure 112 and the upper enclosure 114. Examples of vents and thermal shunts are shown in U.S. Pat. No. 5,625,152 (Pandorf et al.). Another method of cooling the upper enclosure 114 includes physically spacing, or separating, the upper enclosure 114 from the lower enclosure 112. Active cooling can also be employed using fans or thermoelectric coolers.

What is still desired is a new pressure transducer assembly having improved thermal characteristics, wherein one housing enclosure of the transducer is maintained at a low temperature while another housing enclosure is maintained at a high temperature. Preferably, the transducer will be relatively compact, with the housing enclosures closely coupled. In addition, the transducer will preferably not require the use of active cooling devices or vents allowing direct airflow over electronics assemblies contained in the housing enclosures.

SUMMARY OF THE DISCLOSURE

The present disclosure provides a pressure transducer assembly including a sensor enclosure, a pressure sensor received in the sensor enclosure, a tube connected to the pressure sensor and extending out of the sensor enclosure for connection to a source of fluid, and an electronics circuit board electrically connected to the pressure sensor. The assembly also includes an electronics enclosure that is secured to the sensor enclosure and contains the electronics board. The electronics enclosure includes an external housing constructed of thermally conductive material, and a heat transfer plate constructed of thermally conductive material, wherein the heat transfer plate is in physical contact with heat-generating elements of the electronics circuit board and in physical contact with the external housing, such that heat from the heat-generating elements can be dissipated through the external housing. This arrangement allows the circuit board to remain cool even as the sensor is heated.

Among other aspects and advantages, the new and improved transducer assembly has improved thermal characteristics, wherein the electronics enclosure of the transducer is maintained at a low temperature while the sensor enclosure can be maintained at a high temperature. Because the electronics enclosure is secured to the sensor enclosure, the transducer is relatively compact. In addition, the transducer does not require the use of active cooling devices, or vents allowing direct airflow over electronics assemblies contained in the electronic enclosure.

These and other features and advantages of the present disclosure will become more apparent to those of ordinary skill in the art after having read the following detailed descriptions of exemplary embodiments, which are illustrated in the attached drawing figures.

BRIEF DESCRIPTION OF DRAWINGS

Like reference characters designate identical or corresponding components and units throughout the several views.

DETAILED DESCRIPTION OF DISCLOSURE

The present disclosure provides a new and improved pressure transducer assembly. An exemplary embodiment of the assembly 10 is shown in FIGS. 1–5. The assembly 10 generally includes a sensor enclosure 12, a pressure sensor 14 received in the sensor enclosure 12, a tube 16 connected to the pressure sensor 14 and extending out of the sensor enclosure 12 for connection to a source of fluid, and an electronics circuit board 18 electrically connected to the pressure sensor 14. The assembly 10 also includes an electronics enclosure 20 that is secured to the sensor enclosure 12 and contains the electronics board 18. As also shown in FIG. 6, the electronics enclosure 20 has an external housing 22, which is constructed of thermally conductive material, and a heat transfer plate 24, which is also constructed of thermally conductive material. The heat transfer plate 24 is in physical contact with heat-generating elements 26 of the electronics circuit board 18 and in physical contact with the external housing 22, such that heat from the heat-generating elements 26 can be dissipated through the external housing 22. This arrangement allows the circuit board 18 to remain cool even as the sensor 14 is heated.

Among other aspects and advantages of the present disclosure, the new and improved transducer assembly 10 has improved thermal characteristics, wherein the electronics enclosure 20 of the transducer is maintained at a low temperature while the sensor enclosure 12 can be maintained at a high temperature. In addition, because the electronics enclosure 20 is secured to the sensor enclosure 12, the transducer 10 is relatively compact. It should be understood, however, that the electronics enclosure 20 does not have to be secured to the sensor enclosure 12, but can be provided separate from the sensor enclosure 12 and connected by wire (or wirelessly connected).

In the exemplary embodiment shown in FIGS. 1–6 and FIG. 7, the external housing of the electronics enclosure 20 comprises a cap 22 having an end wall 28 and a side wall 30 extending from the end wall to an open end of the cap. As shown best in FIG. 7, the side wall 30 defines pockets 32. As shown best in FIGS. 5–6, the heat transfer plate 24 of the electronics enclosure 20 is sized and shaped to close the open end of the cap 22 such that the electronics board 18 is contained within the cap 22 and the heat transfer plate 24. In FIG. 6, it is shown that the heat transfer plate 24 has fingers 34, which are sized, adapted and positioned to be received, respectively, in the pockets 32 of the external housing 22. The combination of the fingers 34 and the pockets 32 ensures that the heat transfer plate 24 is in physical contact with the external housing 22, such that heat collected by the heat transfer plate 24 can be dissipated through the external housing 22. Although not shown, in an alternative embodiment the pockets 32 can be provided on the heat transfer plate 24 and the fingers 34 provided on the external housing 22. In the exemplary embodiment shown, the electronics enclosure 20 includes four of the fingers 34 and four of the pockets 32. In alternative embodiments, the enclosure 20 can be provided with more or less than four pairs of the fingers 34 and pockets 32, and/or the fingers 34 and pockets 32 may be provided in other shapes and/or sizes.

Figure 3:
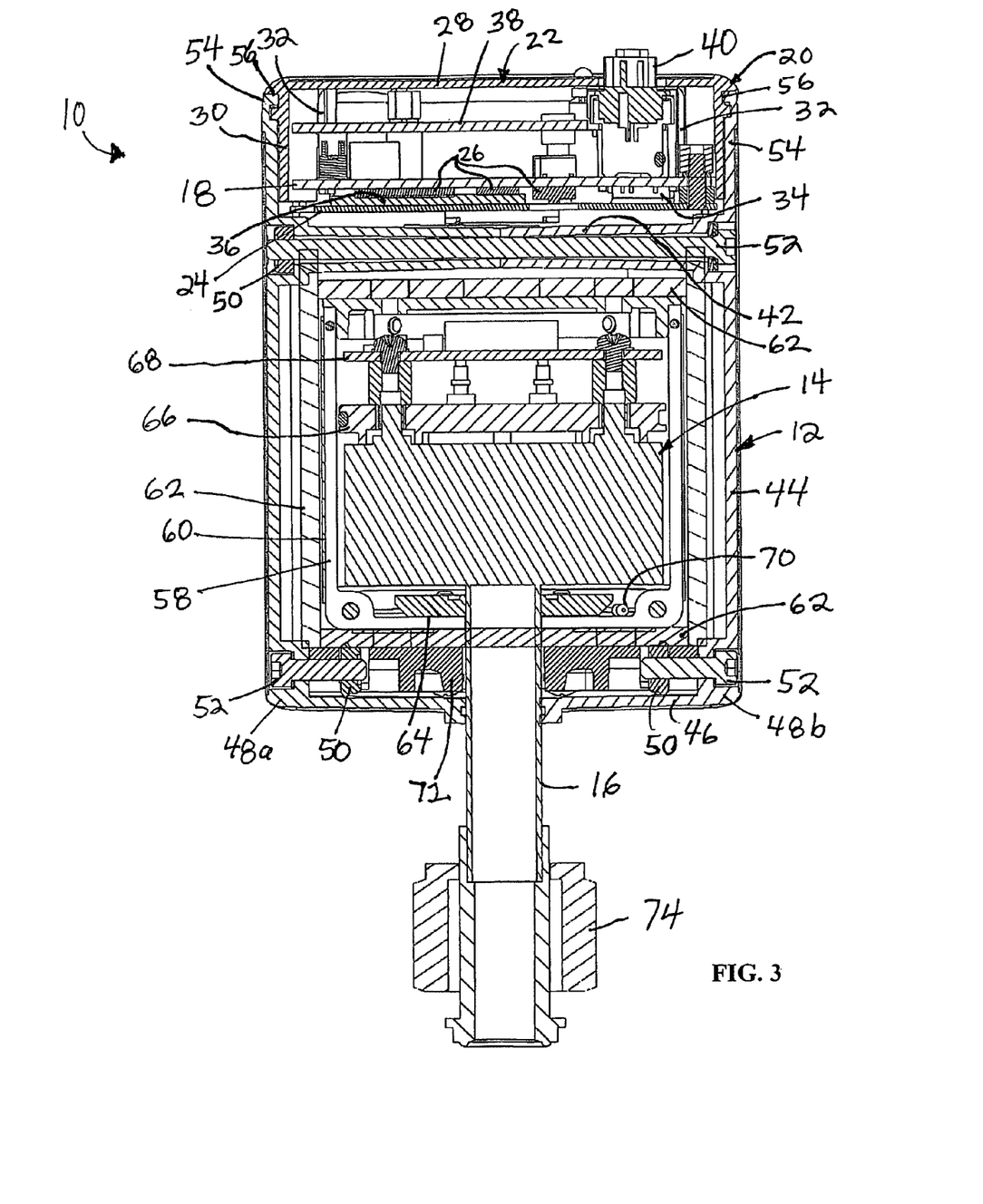
FIG. 3 is a sectional view of the pressure transducer assembly of FIG. 1 taken along line 3—3 of FIG. 2.
Figure 4:
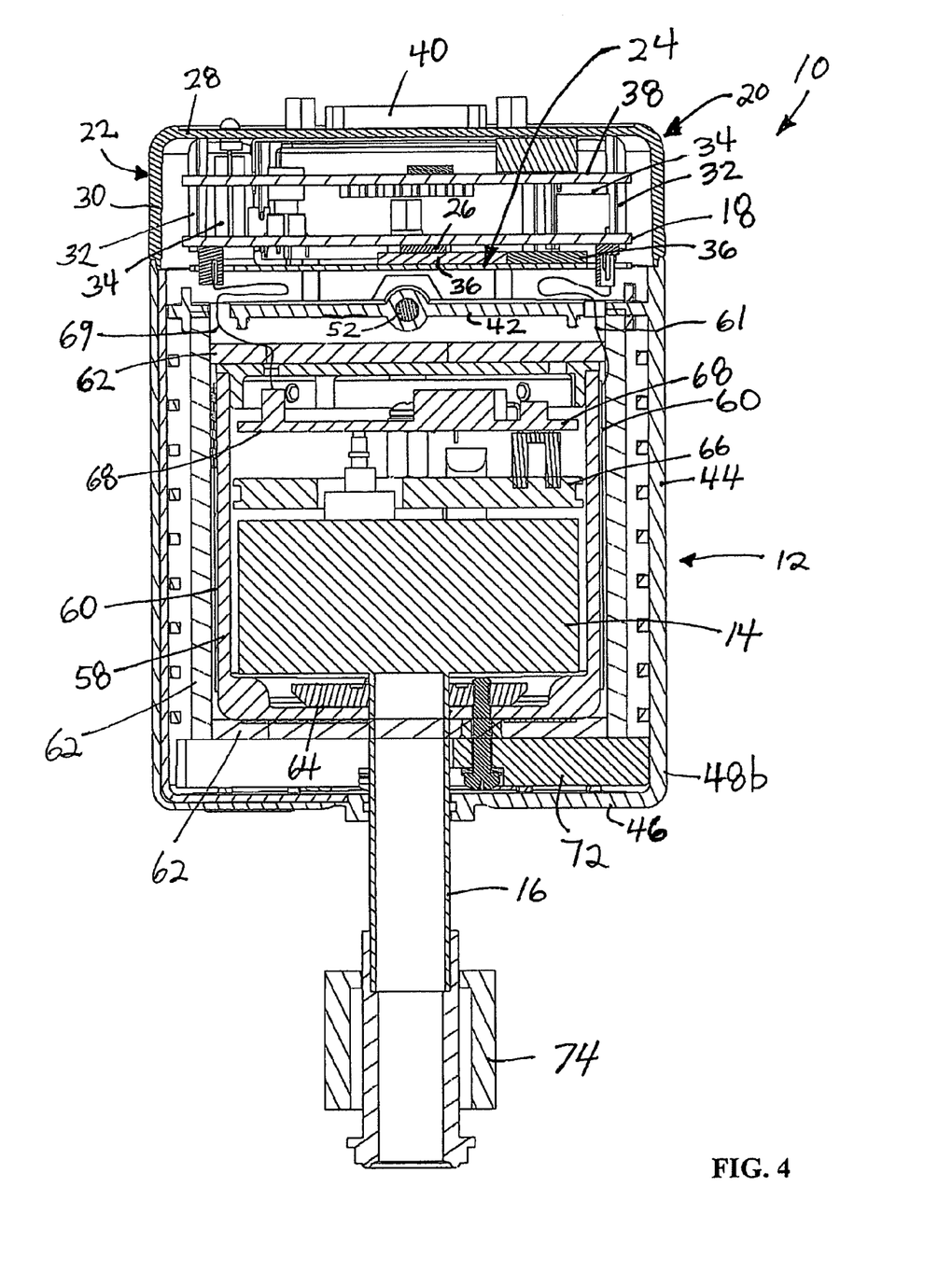
FIG. 4 is a sectional view of the pressure transducer assembly of FIG. 1 taken along line 4—4 of FIG. 2.

In the exemplary embodiment show, the heat-generating elements 26 of the electronics circuit board 18 are located on a single side, or surface, of the circuit board 18 facing the heat transfer plate 24, and the heat transfer plate 24 includes thermally conductive pads 36 in physical contact with the heat-generating elements 26, as shown best in FIGS. 3–4. The pads 36 are also shown in FIG. 6. The pads 36 are provided in different shapes and sizes corresponding to the heat-generating elements 26 of the electronics circuit board 18, so that the pads 36 are in contact with their respective heat generating element 26. According to one exemplary embodiment, the heat transfer plate 24 and the external housing 22 are constructed of a thermally conductive metal, such as aluminum. According to one exemplary embodiment, the fingers 34 are unitarily formed with the heat transfer plate 24. The pads 36 may also be unitarily formed with the plate 24 or simply secured to the plate 24 with a heat transparent adhesive. Surfaces of the pads 36 and the fingers 34 may be lapped to provide better surface contact and heat transfer. A thermal compound may also be provided on the surfaces of the pads 36 and the fingers 34 to improve heat transfer.

Figure 1:
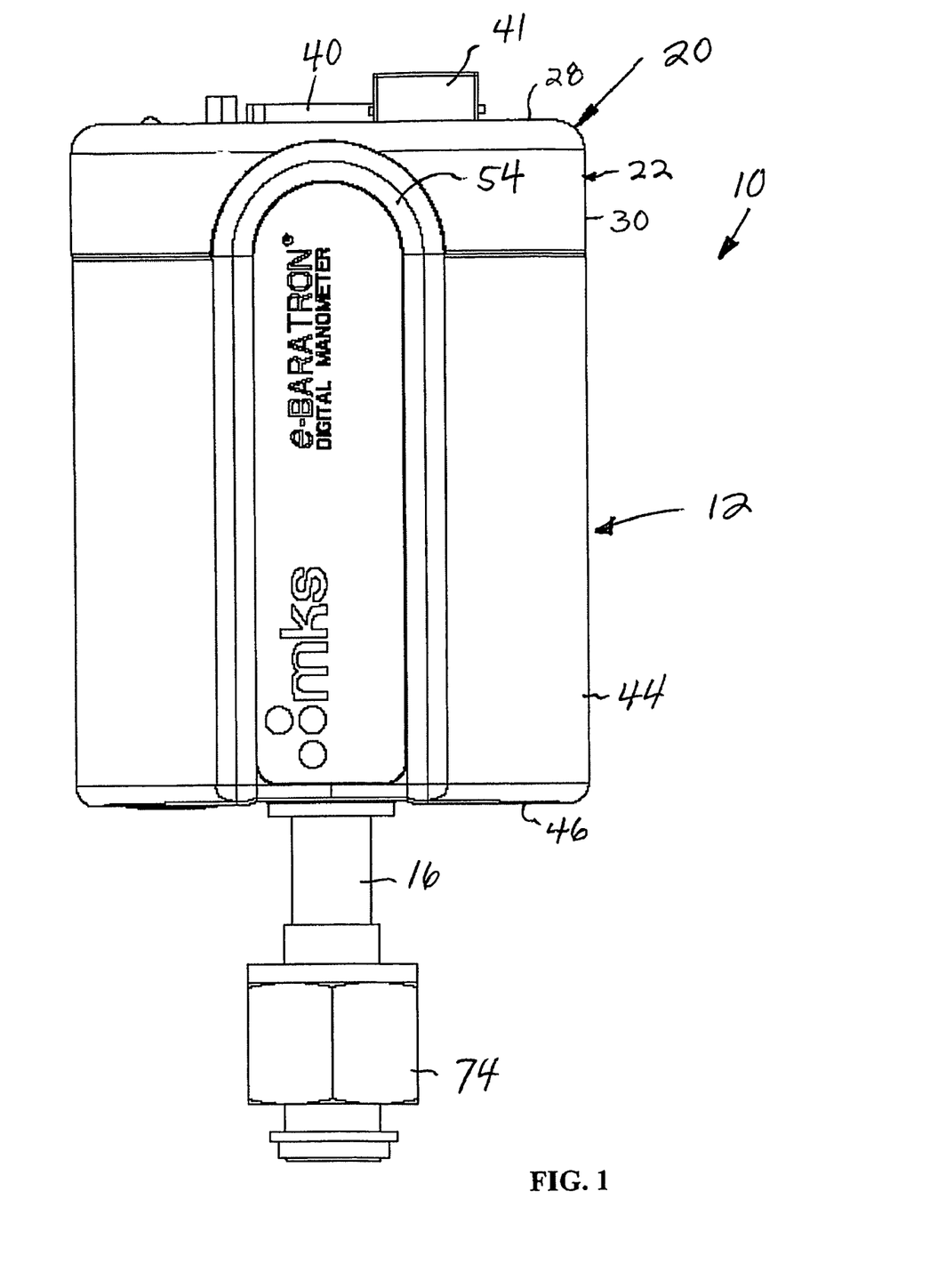
FIG. 1 is a side elevation view of an exemplary embodiment of a pressure transducer assembly constructed in accordance with the present disclosure.
Figure 2:
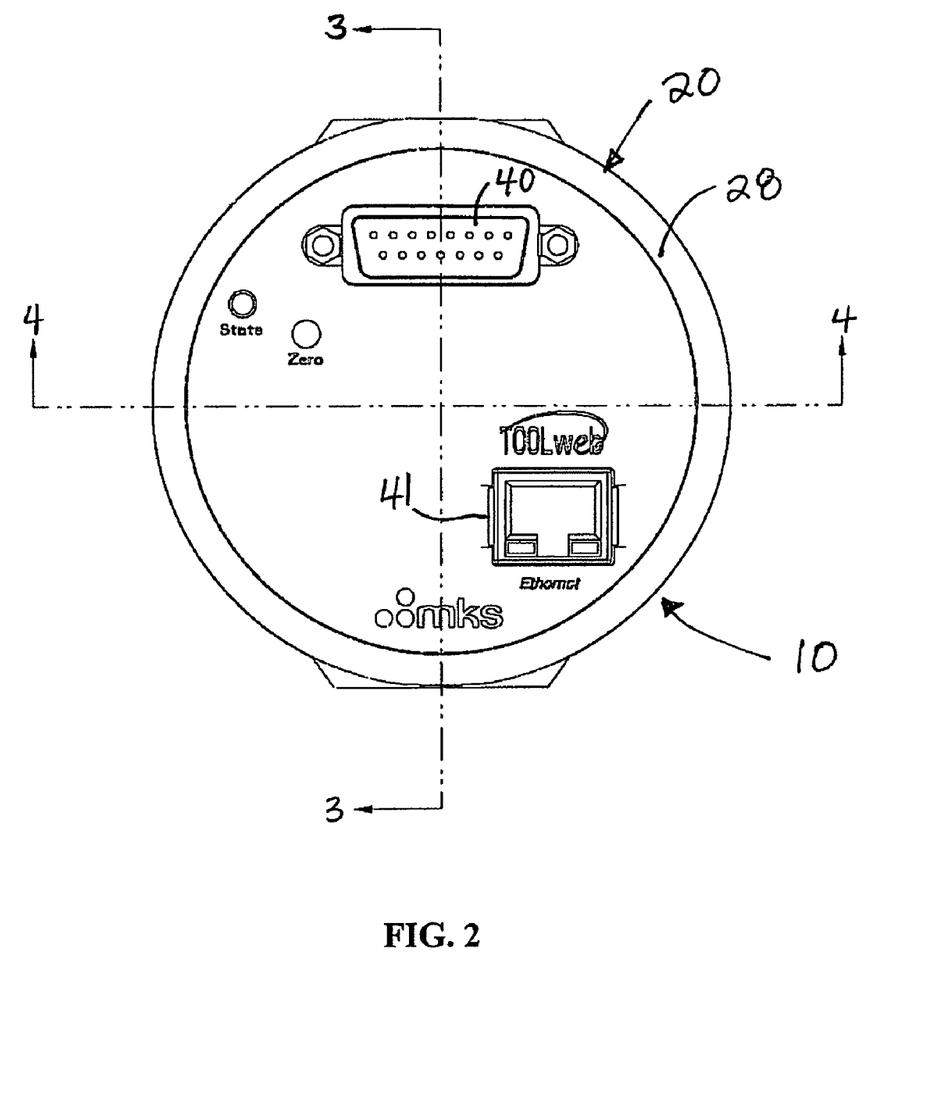
FIG. 2 is a top plan view of the pressure transducer assembly of FIG. 1.

Referring to FIGS. 3, 4, and 6, the electronics circuit board comprises a control board 18 in contact with the heat transfer plate 24, and an input/output board 38 positioned between the control board 18 and the external housing 22 of the electronics enclosure 20. Communication ports 40, 41 are mounted on the control board 18 and the input/output board 38 and extend through the end wall 28 of the external housing 22, as shown in FIG. 2.

Figure 5:
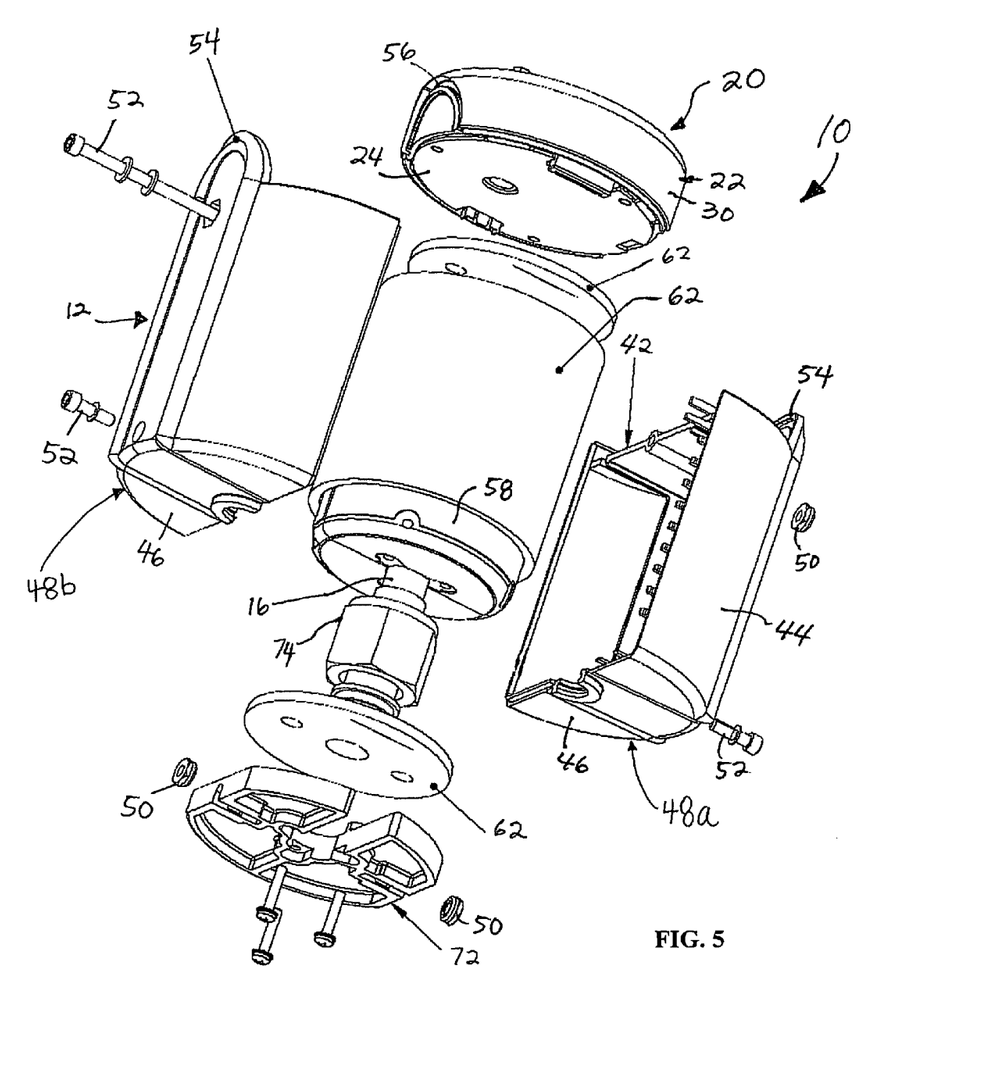
FIG. 5 is an exploded, bottom and side perspective view of the pressure transducer assembly of FIG. 1.
Figures 6, 7:
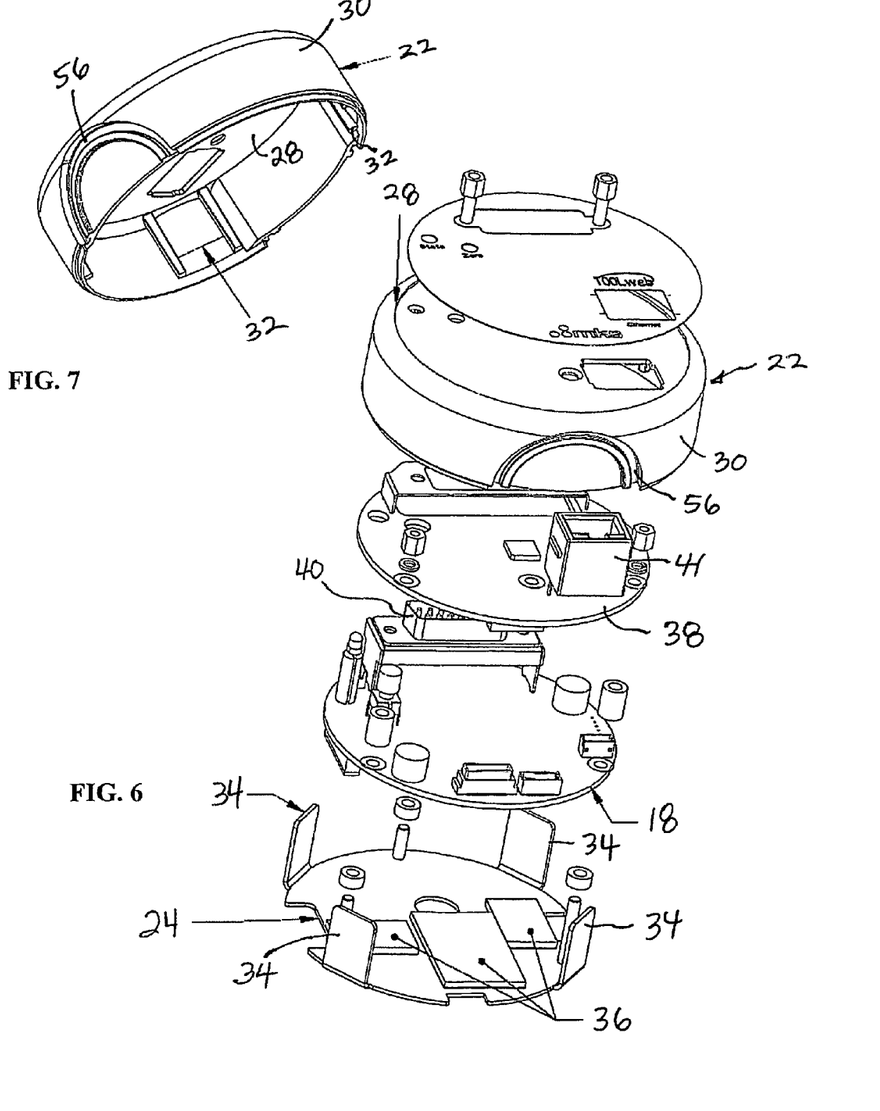
FIG. 6 is an exploded, top and side perspective view of a lower temperature portion of the pressure transducer assembly of FIG. 1.
FIG. 7 is a bottom and side perspective view of a cap of the lower temperature portion of the pressure transducer assembly of FIG. 1.

Referring to FIGS. 3–5, the sensor enclosure 12 is made from thermally non-conductive material, such as plastic, and includes an upper end wall 42, and the electronics enclosure 20 is positioned adjacent the upper end wall 42 of the sensor enclosure 12. The sensor enclosure 12 also includes a side wall 44 and a lower end wall 46. Inner surfaces of the sensor enclosure 12 are coating with a reflective material, such as a mirror nickel finish, to reflect heat back into the enclosure. As shown best in FIG. 5, the exemplary embodiment of the sensor enclosure 12 is assembled from two halves 48a, 48b that are secured together, with nuts 50 and bolts 52 for example. Each half 48a, 48b of the sensor enclosure 12 includes an ear 54 that extends up from the upper end wall 42. The ears 54 are received in grooves 56 in the side wall 30 of the electronics enclosure 20 to secure the electronics enclosure 20 to the sensor enclosure 12, when the enclosure halves 48a, 48b are bolted together.

Referring to FIGS. 3–5, the pressure transducer assembly 10 also includes a heater shell 58 positioned within the sensor enclosure 12 and containing the sensor 14, and a heater 60 connected to the heater shell 58 and electrically connected to the electronics circuit board 18 through a wire 61. A thermal insulating blanket 62 surrounding the heater 60 and the heater shell 58 to retain heat therein can be provided, as shown. Referring to FIGS. 3–4, a thermal gasket 64 is positioned below the pressure sensor 14, within the heater shell 58 and around the tube 16 of the pressure sensor 14, and a thermal plate 66 is positioned above the sensor 14 and within the heater shell. A sensor board 68 is positioned in the heater shell 58 and spaced from the pressure sensor 14. The sensor board 68 includes select electronics for the pressure sensor 14, which are adapted to provide a measurement signal, through wire 69, to the control board 18 in the electronics enclosure 20, based on pressure applied to the pressure sensor 14 through the tube 16. A temperature sensor 70 is also located within the heater shell 58 and connected to the control board 18 in the electronics enclosure 20, so that the control board 18 can properly heat the heater shell.

As shown best in FIGS. 3–5, the exemplary embodiment of the pressure transducer assembly 10 further includes a mounting plate 72, upon which the sensor 14 and heater shell 58 are mounted, and the sensor enclosure 12 is bolted. A coupling device 74 is attached to the tube 16 of the pressure sensor 14 for coupling the pressure transducer assembly 10 to a source of fluid.

While there have been illustrated and described particular embodiments of the present disclosure, it will be appreciated that numerous changes and modifications will occur to those skilled in the art. Accordingly, it is intended that the appended claims cover all those changes and modifications which fall within the spirit and scope of the present disclosure.

What is claimed is:

1. A pressure transducer assembly comprising:
   a sensor enclosure;
   a pressure sensor received in the sensor enclosure;
   a tube connected to the pressure sensor and extending out of the sensor enclosure for connection to a source of fluid;
   an electronics circuit board electrically connected to the pressure sensor; and
   an electronics enclosure containing the electronics board and secured to the sensor enclosure, wherein the electronics enclosure includes, an external housing constructed of thermally conductive material, and a heat transfer plate constructed of thermally conductive material, wherein the heat transfer plate is in physical contact with heat-generating elements of the electronics circuit board and in physical contact with the external housing, such that heat from the heat-generating elements can be dissipated through the external housing.

2. A pressure transducer assembly according to claim 1, wherein:

the external housing of the electronics enclosure comprises a cap having an end wall and a side wall extending from the end wall to an open end of the cap, and wherein the side wall defines pockets; and the heat transfer plate of the electronics enclosure is sized and shaped to close the open end of the cap such that the electronics board is contained within the cap and the heat transfer plate, and wherein the heat transfer plate has fingers received in the pockets of the external housing.

3. A pressure transducer assembly according to claim 2, wherein the heat-generating elements of the electronics circuit board are located on a surface of the circuit board facing the heat transfer plate, and the heat transfer plate includes pads in physical contact with the heat-generating elements.

4. A pressure transducer assembly according to claim 3, wherein the electronics circuit board comprises a control board in contact with the heat transfer plate and an input/output board positioned between the control board and the external housing of the electronics enclosure.

5. A pressure transducer assembly according to claim 4, wherein the sensor enclosure is made from thermally nonconductive material and includes an end wall, and the electronics enclosure is positioned adjacent the end wall of the sensor enclosure.

6. A pressure transducer assembly according to claim 1, further comprising:

a heater shell positioned within the sensor enclosure and containing the sensor; and a heater connected to the heater shell and electrically connected to the electronics circuit board.

7. A pressure transducer assembly according to claim 6, further comprising a thermal insulating blanket surrounding the heater and the heater shell and a reflective coating on inner surfaces of the sensor enclosure.

8. A pressure transducer assembly according to claim 1, wherein:

the external housing of the electronics enclosure comprises a cap having an end wall and a side wall extending from the end wall to an open end of the cap, and wherein the side wall defines pockets; and the heat transfer plate of the electronics enclosure is sized and shaped to close the open end of the cap such that the electronics board is contained within the cap and the heat transfer plate, and wherein the heat transfer plate has fingers received in the pockets the external housing.

9. A pressure transducer assembly according to claim 1, wherein the heat-generating elements of the electronics circuit board are located on a surface of the circuit board facing the heat transfer plate, and the heat transfer plate includes pads in physical contact with the heat-generating elements.

10. A pressure transducer assembly according to claim 1, wherein the sensor enclosure is made from thermally nonconductive material and includes an end wall, and the electronics enclosure is positioned adjacent the end wall of the sensor enclosure.

11. A pressure transducer assembly comprising:

a sensor enclosure;

a heated pressure sensor received in the sensor enclosure;

an electronics circuit board electrically connected to the pressure sensor; and an electronics enclosure containing the electronics board and secured to the sensor enclosure, wherein the electronics enclosure includes, an external housing constructed of thermally conductive material, and a heat transfer plate constructed of thermally conductive material, wherein the heat transfer plate is in physical contact with heat-generating elements of the electronics circuit board, wherein one of the heat transfer plate and the external housing includes fingers received in pockets located on the other of the heat transfer plate and the external housing so that the heat transfer plate is in contact with the external housing, such that heat from the heat-generating elements can be dissipated through the external housing.

12. A pressure transducer assembly according to claim 11, wherein the external housing of the electronics enclosure defines the pockets, and the fingers are unitarily formed with the heat transfer plate and are received in the pockets of the external housing.

13. A pressure transducer assembly according to claim 11, wherein the heat-generating elements of the electronics circuit board are located on a surface of the circuit board facing the heat transfer plate, and the heat transfer plate includes pads in physical contact with the heat-generating elements.

14. A pressure transducer assembly according to claim 11, wherein the electronics circuit board comprises a control board in contact with the heat transfer plate and an input/output board positioned between the control board and the external housing of the electronics enclosure.

15. A pressure transducer assembly according to claim 11, wherein the sensor enclosure is made from thermally nonconductive material and includes an end wall, and the electronics enclosure is positioned adjacent the end wall of the sensor enclosure.

16. A pressure transducer assembly according to claim 11, further comprising:

a heater shell positioned within the sensor enclosure and containing the sensor; and a heater connected to the heater shell and electrically connected to the electronics circuit board.

17. A pressure transducer assembly according to claim 16, further comprising a thermal insulating blanket surrounding the heater and the heater shell.

18. A pressure transducer assembly comprising:

a sensor enclosure;

a pressure sensor received in the sensor enclosure; an electronics circuit board electrically connected to the pressure sensor; and an electronics enclosure containing the electronics board, wherein the electronics enclosure includes, an external housing constructed of thermally conductive material, and a heat transfer plate constructed of thermally conductive material, wherein the heat transfer plate includes pads sized and adapted to contact heat-generating elements of the electronics circuit board.

19. A pressure transducer assembly according to claim 18, wherein the heat-generating elements of the electronics circuit board are located on a surface of the circuit board facing the heat transfer plate, and the pads of the heat transfer plate are located on a surface of the heat transfer plate facing the heat-generating elements.

20. A pressure transducer assembly according to claim 18, wherein the heat transfer plate has fingers received in pockets of the external housing of the electronics enclosure.

* * * * *